(12) United States Patent
Paterson

(10) Patent No.: US 9,118,493 B2
(45) Date of Patent: Aug. 25, 2015

(54) PROCESSING REQUESTS

(75) Inventor: Christopher Paterson, Enfield (GB)

(73) Assignee: METASWITCH NETWORKS LTD, Enfield (GB)

(*) Notice: Subject to any disclaimer, the term of this patent is extended or adjusted under 35 U.S.C. 154(b) by 62 days.

(21) Appl. No.: 13/600,173

(22) Filed: Aug. 30, 2012

(65) Prior Publication Data

US 2013/0229949 A1 Sep. 5, 2013

(30) Foreign Application Priority Data

Aug. 31, 2011 (GB) .................................. 1115024.0

(51) Int. Cl.
*H04L 12/16* (2006.01)
*H04M 3/42* (2006.01)
*H04M 3/54* (2006.01)
*H04L 29/06* (2006.01)

(52) U.S. Cl.
CPC ............. *H04L 12/16* (2013.01); *H04L 65/1006* (2013.01); *H04L 65/1069* (2013.01); *H04L 65/1073* (2013.01); *H04L 65/1096* (2013.01); *H04M 3/42153* (2013.01); *H04M 3/54* (2013.01)

(58) Field of Classification Search
CPC ....... G06F 15/16; G06F 15/173; G06F 21/20; G06F 15/177; H04L 12/16; H04L 12/66; H04L 9/32; H04M 3/42; H04W 4/16; H04W 4/00
USPC ......... 370/259, 338, 352, 356, 328, 260, 401; 379/230, 221.09, 219, 207.16, 201.12; 455/456.1, 456.5; 709/238, 230, 227, 709/228
See application file for complete search history.

(56) References Cited

U.S. PATENT DOCUMENTS

| 6,771,641 | B1 * | 8/2004 | Sollee et al. ................... 370/356 |
| 8,160,214 | B1 * | 4/2012 | Samarasinghe ............ 379/88.14 |
| 2003/0043992 | A1 | 3/2003 | Wengrovitz |
| 2008/0310406 | A1 * | 12/2008 | Huang .......................... 370/356 |
| 2009/0036128 | A1 * | 2/2009 | Raguparan et al. ........... 455/436 |
| 2009/0150562 | A1 * | 6/2009 | Kim et al. ..................... 709/238 |
| 2010/0098057 | A1 * | 4/2010 | Stewart ......................... 370/352 |
| 2011/0110512 | A1 * | 5/2011 | Chen et al. ................ 379/201.12 |
| 2011/0255446 | A1 * | 10/2011 | Potts et al. .................... 370/260 |
| 2012/0324061 | A1 * | 12/2012 | Parsons et al. ................ 709/220 |
| 2013/0007293 | A1 * | 1/2013 | Den Hartog et al. ......... 709/228 |

FOREIGN PATENT DOCUMENTS

| EP | 1933577 A1 | 6/2008 |
| GB | 2445876 A | 7/2008 |

* cited by examiner

*Primary Examiner* — Jamal Javaid
*Assistant Examiner* — Wali Butt
(74) *Attorney, Agent, or Firm* — EIP US LLP

(57) ABSTRACT

Measures for modifying settings of communication services for Session Initiation Protocol (SIP) devices in a telecommunications network are provided. A code-containing SIP message comprising a code entered by a user of a SIP device is received from the SIP device. The code identifies a communication service. The communication service that the code relates to is determined on the basis of the received code. A function-activating SIP message comprising data specifying one or more characteristics of at least one function to be activated by the SIP device in a data collection operation is transmitted to the SIP device. A completed data-containing SIP message comprising communication service data entered by the user of the SIP device is received from the SIP device. The communication service data is processed in accordance with the identified communication service.

20 Claims, 7 Drawing Sheets

PROCESSING REQUESTS

CROSS REFERENCE TO RELATED APPLICATION

This application claims priority to foreign Patent Application No. GB 1115024.0, filed on Aug. 31, 2011, the content of which is hereby incorporated by reference herein in its entirety.

TECHNICAL FIELD

The present disclosure relates to communication services. In particular, but not exclusively, the present disclosure relates to methods, apparatus and computer program products for modifying settings of communication services for SIP devices in a telecommunications network.

BACKGROUND

Telephony users today can modify some of their communication service settings using their user device via a user interface, for example a telephony user interface. For example, a user can switch on unconditional call forwarding by dialing an access code (say, *72), and then dialing the telephone number they want calls to be forwarded to. There are different specifications for communication services, for example as specified by Telcordia™ and the European Telecommunications Standards Institute (ETSI), each providing a different user experience. With ETSI-style services, the telephone switch or feature server providing the communication service plays announcements to the user to explain the status of the communication service, for example to prompt them to enter a forwarding number. With Telcordia-style services, the user hears tones instead; in the unconditional call forwarding example above, the user would hear a stutter dial tone after dialing *72, a confirmation tone after dialing a valid forwarding number, or a reorder tone if there was a problem.

With ETSI-style services, the telephone switch or feature server sets up a media stream between the user's telephone and a media resource server in order to play announcements for communication services. Once the media stream is set up, the telephone switch or feature server instructs the media resource server to listen for digit tones in the media stream in order to collect digits from the user device for implementing the settings modification desired by the user. This introduces a window after the user has dialed their initial set of digits but before digit detection has been set up on the media resource server, during which no digit detection is taking place; any digits the user dials during this window will be lost. ETSI users therefore need to wait until the announcement starts before dialing any further digits.

ETSI supports a mechanism for the setting up of telephone calls which involves a telephone switch or feature server transmitting a SIP 484 Address Incomplete message with a Min-Digits: X function, where X is the number of digits transmitted so far plus one. This process is repeated to collect a single additional digit at a time until a full telephone number is collected.

With Telcordia-style services, there are typically no announcements to play, and most access gateways which provide communication services are capable of playing the relevant tones themselves. The telephone switch providing telephony services to the user will therefore usually ask the access gateway to play the tones and collect further digits directly, without a media resource server being involved. This means that there is no window during which digits can be lost, and consequently, many Telcordia subscribers are used to being able to dial an access code plus additional digits very quickly, for example activating call forwarding using speed dial functionality.

Problems arise where the Session Initiation Protocol (SIP) is used between the user and the telephone switch or feature server providing communication services, for example because the user has a SIP telephony device, their telephone is connected to a SIP Broadband Loop Carrier, or because the feature server has a SIP interface to a telephone switch or call control function. Unlike gateway control protocols such as Media Gateway Control Protocol (MGCP) or H.248 ('Megaco'), SIP is peer-to-peer and has no mechanism by which a telephone switch or feature server can instruct a user device to play a tone or collect digits. Existing implementations overcome this problem in one of three ways, but all of them are flawed.

A flow diagram for a first flawed prior art attempt is shown in FIG. 1 where a user with a SIP device picks up the handset of their SIP device in step 1a and is required to dial the complete set of digits including an access code (step 1b) for the communication service they require, in this case access code *72 for an unconditional call forwarding service, and telephone number digits 15552001234 (step 1c) all at once. The user does not hear any tones between digit sequences to reassure them that all is OK, and either has to wait for a timeout (for example 4 seconds or so) or press # or "Dial" on their SIP device when finished before the feature server is finally contacted with a SIP INVITE message in step 1d. This is a clearly unsatisfactory user experience.

A flow diagram for a second flawed prior art attempt is shown in FIG. 2 where a telephone switch or feature server uses a media resource server to play tones and collect digits from the SIP device of the user. The user picks up the handset of their SIP device in step 2a and dials the access code *72 for the communication service they require in step 2b. The SIP device sends a SIP INVITE message containing the access code to the feature server in step 2c. The feature server sets up a session between the SIP device and a media resource server in step 2d, including instructing the media resource server to play a stutter tone to the user's SIP device and collect digits entered by the user on their SIP device. The media resource server sends Session Description Protocol (SDP) data for a Real-time Transport Protocol (RTP) stream to/from the feature server in step 2e. The feature server forwards the SDP data on to the SIP device in a SIP 200 OK message in step 2f. The media server then plays a stutter tone to the user's SIP device in step 2g to inform the user that he may begin to enter digits. The digits from the user's SIP device are transmitted into the media stream to the media resource server in step 2h and then on to the feature server in step 2i. This approach suffers from the same restriction as with ETSI-style services in that the user must wait until the media stream has been set up before they dial additional digits. If additional digits are dialed too early, they may be lost.

A flow diagram for a third flawed prior art attempt is shown in FIG. 3 where a user's SIP device has enough intelligence to understand each of the access codes and their user experience and so plays the correct tone(s) and collects any required additional digit(s) itself before sending the complete set of digits to the telephone switch or feature server. The user picks up the handset of their SIP device in step 3a and dials the access code *72 (step 3b) for the communication service they require. The user's SIP device recognises the access code as being for an unconditional call forwarding communication service and determines (or assumes) that the user has a variable variant of unconditional call forwarding which requires entry of additional digits in the form of a telephone number to which calls should be forwarded to. The user's SIP device then plays a stutter dial tone to inform the user that they may start entering a telephone number in step 3*d* which the user enters in step 3*e*. The SIP device then sends the access code and entered telephone number digits to the feature server in step 3*f*. The above operation by the SIP device can be difficult to achieve, even with a SIP device with upgraded capabilities because there are a number of communication services with different sequences of tones and digits, and different users may have different combinations of these services. Further, the same access code may require different behaviour depending on the variant of communication service the subscriber has; for example, a subscriber with a fixed variant of call forwarding just dials *72 and should not be played a stutter dial tone or be prompted to enter additional digits.

There is therefore a need to provide improved ways of interfacing with communication services in a SIP environment.

SUMMARY

In accordance with first embodiments, there is a method of modifying settings of communication services for Session Initiation Protocol (SIP) devices in a telecommunications network, the method comprising:
  receiving, from a SIP device, a code-containing SIP message comprising a code entered by a user of the SIP device, the code identifying a communication service;
  determining, on the basis of the received code, the communication service that the code relates to;
  transmitting, to the SIP device, a function-activating SIP message comprising data specifying one or more characteristics of at least one function to be activated by the SIP device in a data collection operation;
  receiving, from the SIP device, a completed data-containing SIP message comprising communication service data entered by the user of the SIP device; and
  processing the communication service data in accordance with the identified communication service.

In embodiments the code comprises an access code for the communication service, whereas in other embodiments, the code comprises a telephone number for the communication service.

In embodiments, the communication service may be invoked as soon as the user finishes dialing the code.

In embodiments, users can enter communication service data quickly with no window where the data could be lost.

In embodiments, the SIP device does not need to be upgraded or enhanced in order to understand communication service logic or be provisioned with or look up additional subscriber configuration.

In embodiments, communication service logic is kept on the switch or feature server responsible for providing the communication service and ability to modify settings thereof. Keeping service logic away from the SIP devices allows updating of the communication services without requiring all SIP devices to undergo corresponding updates.

In embodiments, the at least one function comprises the playing of a tone and the one or more characteristics comprise tone identification data defining the tone. Hence, the user hears a tone during accessing of the communication service, for example to reassure the user they may begin to enter digits via their SIP device.

In embodiments, the at least one function comprises a digit collection function and the one or more characteristics comprise digit map data specifying one or more digits to be collected by the digit collection function. Hence, appropriate digits, for example the digits of a telephone number, can be collected from the user in order to modify settings of a communication service.

In embodiments, the communication service data comprises the entire one or more digits specified in the digit map data, and the processing comprises modifying one or more settings of the identified communication service for the SIP device according to the received all of the one or more digits. Hence, if the user enters all of the required digits via their SIP device, one or settings of the communication service can be modified accordingly.

In embodiments, the digit map data specifies a plurality of digits to be collected by the digit collection function, and the method comprises:
  receiving, from the SIP device, an incorrect data-containing SIP message comprising one or more digits not specified in the digit map data; and
  transmitting, in response to the incorrect data-containing SIP message, a further function-activating SIP message comprising data specifying one or more characteristics of at least one function to be activated by the SIP device in a further data collection operation.

The incorrect data-containing SIP message could for example contain one or more digits which do not match the required digit map. The incorrect data-containing SIP message could for example contain the correct amount of digits to match the digit map, but the digits are incorrect in some other way, for example the digit map requires ten digits and the user of the SIP device dials ten digits, but those digits do not form a real telephone number. The incorrect data-containing SIP message could for example contain the correct amount of digits to match the current digit map, but the switch requires more digits to modify settings of the appropriate communication service.

The at least one further function may comprise a further digit collection function and the one or more further characteristics may comprise further digit map data specifying one or more further digits to be collected by the SIP device. The at least one further function may comprise the playing of a further tone and the one or more further characteristics may comprise further tone identification data defining the further tone. Hence, if the user does not enter all the digits required to modify one or more settings of the communication service, then the user can be informed of such and the SIP device primed for collection of the further required digits.

In embodiments, the digit map data specifies a plurality of digits to be collected by the digit collection function, and the method comprises:
  receiving, from the SIP device, an incorrect data-containing SIP message comprising one or more digits not specified in the digit map data; and
  transmitting, in response to the incorrect data-containing SIP message, a further function-activating SIP message comprising data specifying one or more characteristics of at least one function to be activated by the SIP device in a further data collection operation.

Hence, if the user makes a mistake in entering the digits required to modify one or more settings of the communication service, then the user can be informed of such and the SIP device primed once more for collection of the correct digits.

In embodiments, the completed data-containing SIP message comprises the code. Hence, the switch need not keep a record of the code received from the SIP device in the first SIP message. This simplifies the feature logic required at the switch and reduces memory required for implementing such.

According to embodiments, the processing comprises initiating establishment of a communication session between the SIP device and a media gateway device for communication of media data in relation to the identified communication service. The initiation may comprise transmitting a SIP 200 OK message to the SIP device, the SIP 200 OK message comprising SDP address data for the media gateway device. Hence, one or more announcements can be played as media data to the user of the SIP device.

In embodiments, the code-containing SIP message comprises a SIP INVITE message, a SIP INVITE message, or a SIP UPDATE message.

In embodiments, the, or each, function-activating SIP message comprises one or more of a SIP 484 Address Incomplete message, a SIP 183 Session Progress message; and/or a SIP INFO message.

In embodiments, the, or each, data-containing SIP message comprises one or more of a SIP INVITE message, a SIP INFO message, and/or a SIP UPDATE message.

In embodiments, at least a part of the data specifying the one or more characteristics of the at least one function to be activated by the SIP device in the data collection operation and/or in the further data collection operation are contained in an extension header of the respective function-activating SIP message. In embodiments, at least a part of the data specifying the one or more characteristics of the at least one function to be activated by the SIP device in the data collection operation and/or in the further data collection operation are contained in the message body of the respective function-activating SIP message. In embodiments, at least a part of the data specifying the one or more characteristics of the at least one function to be activated by the SIP device in the data collection operation and/or in the further data collection operation are contained in a SIP Alert-Info or a SIP Min-Digits header.

In accordance with second embodiments, there is a method of modifying settings of communication services for SIP devices in a telecommunications network, the method comprising at a SIP device:
 transmitting a code-containing SIP message comprising a code entered by a user of the SIP device, the code identifying a communication service;
 receiving a function-activating SIP message comprising data specifying one or more characteristics of at least one function to be activated by the SIP device;
 activating the at least one function in a data collection operation; and
 in response to receipt of communication service data via user entry, transmitting a completed data-containing SIP message comprising the communication service data.

In accordance with third embodiments, there is a method of modifying settings for communication session services for SIP devices in a telecommunications network, the method comprising:
 receiving, from a SIP device, a SIP communication session setup request message comprising a code identifying a communication session service;
 determining, on the basis of the received code, digit map data specifying one or more digits to be collected by the SIP device in a data collection operation; and
 transmitting, to the SIP device, a SIP communication session setup response message comprising the digit map data.

In accordance with fourth embodiments, there is a method of modifying settings for communication session services for SIP devices in a telecommunications network, the method comprising:
 receiving, from a SIP device, a SIP communication session setup request message comprising a code identifying a communication session service;
 determining, on the basis of the received code, tone specification data specifying a tone to be played by the SIP device in a data collection operation; and
 transmitting, to the SIP device, a SIP communication session setup response message comprising the tone specification data.

In accordance with fifth embodiments, there is apparatus comprising:
 at least one processor; and
 at least one memory including computer program code, the at least one memory and the computer program code being configured to cause the processor to perform the method of the first, second, third or fourth aspects.

The apparatus adapted to perform the method of the first aspect may for example comprise a telephone switch or a softswitch. The apparatus adapted to perform the method of the second aspect may for example comprise a SIP telephone.

In accordance with sixth embodiments, there is computer software adapted to perform the method of the first, second, third or fourth aspects.

In accordance with seventh embodiments, there is a computer program product comprising a non-transitory computer-readable storage medium having computer readable instructions stored thereon, the computer readable instructions being executable by a computerised device to cause the computerized device to perform a method for modifying settings of communication services for Session Initiation Protocol (SIP) devices in a telecommunications network, the method comprising:
 receiving, from a SIP device, a code-containing SIP message comprising a code entered by a user of the SIP device, the code identifying a communication service;
 determining, on the basis of the received code, the communication service that the code relates to;
 transmitting, to the SIP device, a function-activating SIP message comprising data specifying one or more characteristics of at least one function to be activated by the SIP device in a data collection operation;
 receiving, from the SIP device, a completed data-containing SIP message comprising communication service data entered by the user of the SIP device; and
 processing the communication service data in accordance with the identified communication service.

In accordance with eighth embodiments, there is a computer program product comprising a non-transitory computer-readable storage medium having computer readable instructions stored thereon, the computer readable instructions being executable by a computerised device to cause the computerized device to perform a method for modifying settings of communication services for SIP devices in a telecommunications network, the method comprising at a SIP device, the method comprising:
 transmitting a code-containing SIP message comprising a code entered by a user of the SIP device, the code identifying a communication service;
 receiving a function-activating SIP message comprising data specifying one or more characteristics of at least one function to be activated by the SIP device;
 activating the at least one function in a data collection operation; and
 in response to receipt of communication service data via user entry, transmitting a completed data-containing SIP message comprising the communication service data.

Further features and advantages will become apparent from the following description of preferred embodiments, given by way of example only, which is made with reference to the accompanying drawings.

DETAILED DESCRIPTION

Figure 1:
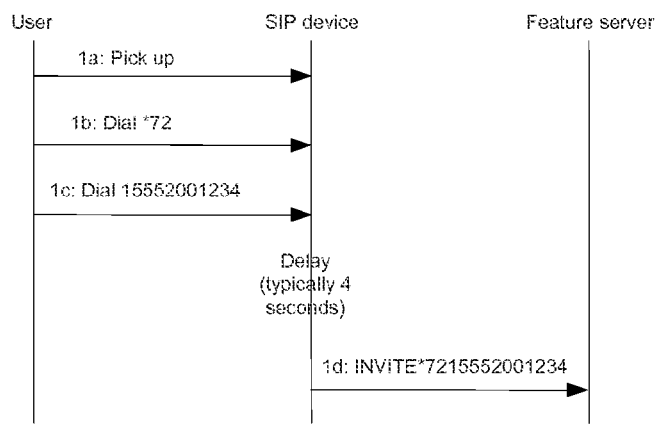
FIG. 1 shows a flow diagram according to the prior art.
Figure 2:
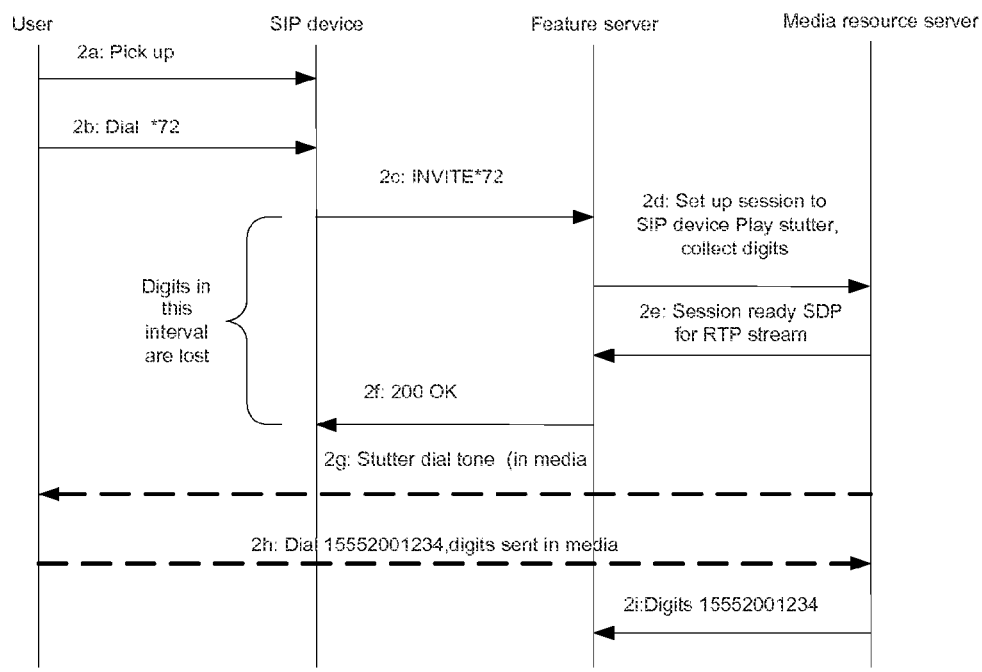
FIG. 2 shows a flow diagram according to the prior art.
Figure 3:
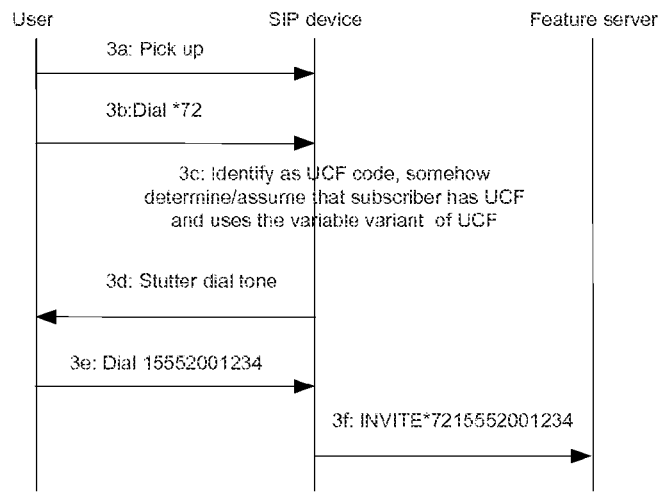
FIG. 3 shows a flow diagram according to the prior art.
Figure 4:
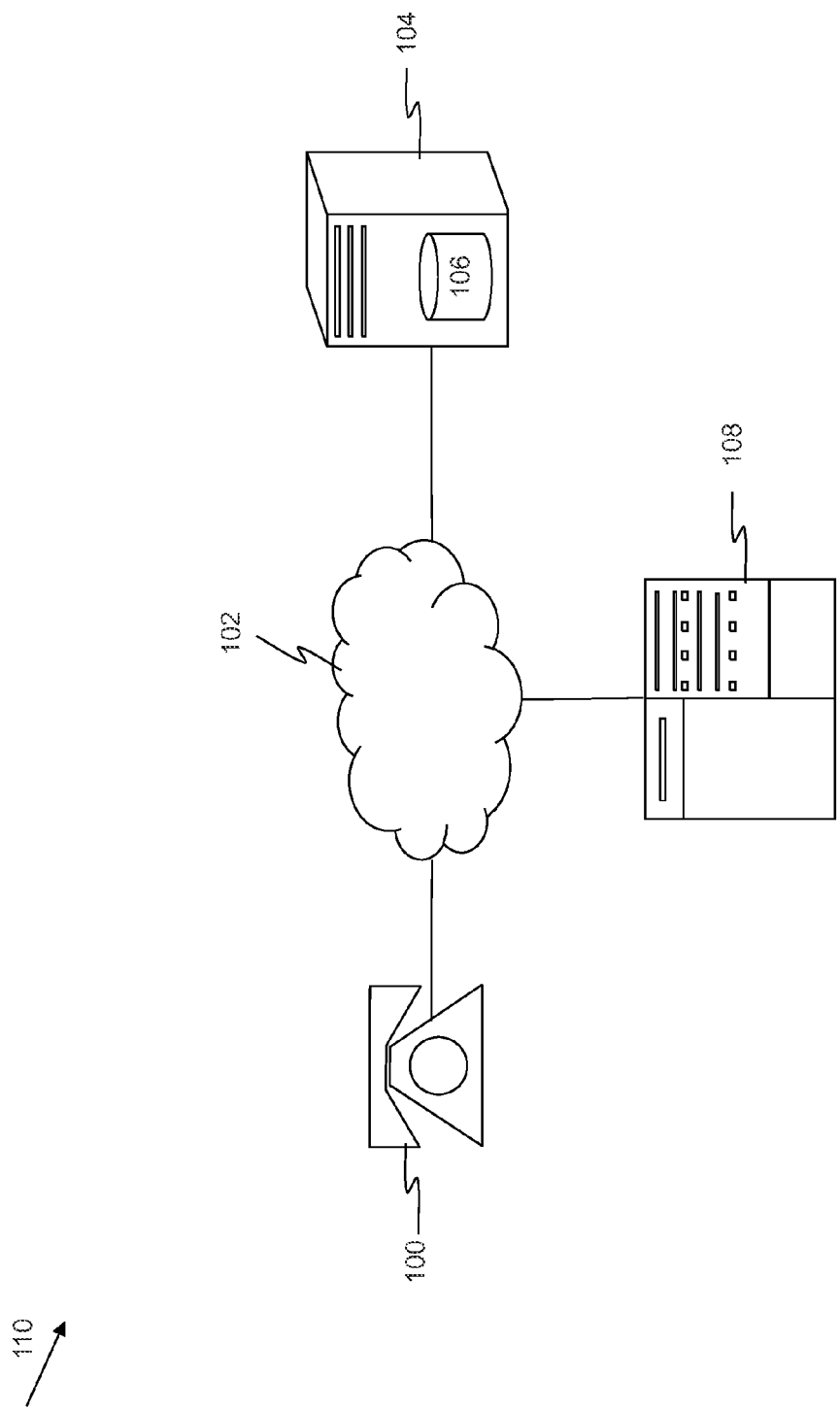
FIG. 4 shows a system diagram of a telecommunications network according to embodiments.

FIG. 4 shows a system diagram of a telecommunications network 110 according to embodiments. Telecommunications network 110 includes a SIP user device 100 connected to a softswitch 104 via a network 102. Telecommunications network 110 also includes a media gateway device 108 connected to network 102.

Network 102 may comprise one or more Public Switched Telephone Networks (PSTNs), one or more private Internet Protocol (IP) networks and/or the Internet.

SIP device 100 comprises a user (or endpoint) device, for example a SIP telephony device, which is able to process SIP signaling information in relation to communication sessions conducted with other devices in telecommunications network 110. SIP device 100 is provided with communication services, for example telephony services, by switch 104.

Switch 104 is responsible for providing an interface whereby users can modify settings of their communication services, for example setting up or modifying communication services such as call forwarding, unconditional call forwarding, speed dial, call screening, call waiting, caller ID, etc. Switch 104 is also responsible for providing switching of communication sessions, for example telephone or video calls, for a number of devices (not shown) such as SIP device 100 including provision of dial tone, ringing tone, etc. Switch 104 may also be referred to as a feature server, telephone switch, local telephone exchange, central office, class 5 switch or softswitch. Switch 104 may also include the ability to select processes that can be applied to such sessions, routing for such session based on signaling and subscriber database information, the ability to transfer control of session to other network elements and management functions such as provisioning, fault detection and billing.

Switch 104 includes a database 106 for storing session related data such as session state and routing information. Database 106 is also used for storing service logic and other data relating to modification of settings for communication services such as codes (access codes and/or telephone number codes), functions related to digit map data and tone identification data.

Media resource server 108 is able to provide media services for communication services under the control of switch 104. Such media services may be carried out via a media stream such as an RTP media stream between media resource server 108 and one or more user devices. The media services may include playing of tones and/or announcements to user devices and collection of digits from user devices. Media resource server 108 may comprise a media gateway device capable of converting data from a format required in one part of telecommunications network 110 (for example a circuit-switched part) to a format required for another part of telecommunications network 110 (for example a packet-switched part).

Embodiments overcome the aforementioned problems with the prior art by keeping the logic about how settings for communication services can be modified and what the user experience should be in the network, such as in switch 104.

Embodiments also create a means for switch 104 to convey to a SIP device over SIP messaging that one or more functions should be activated on the SIP device, including conveying data specifying one or more characteristics of such functions to the SIP device. Examples of such functions may include a digit collection function or a tone playing function. Examples of characteristics of such functions may include digit map data specifying one or more digits to be collected by a digit collection function, or tone identification data defining a tone to be played by a tone playing function.

Embodiments also have the SIP device act on such SIP messages and convey using SIP any additional digits dialed by the user on their SIP device to the switch for processing in relation to the appropriate communication service.

Figure 5:
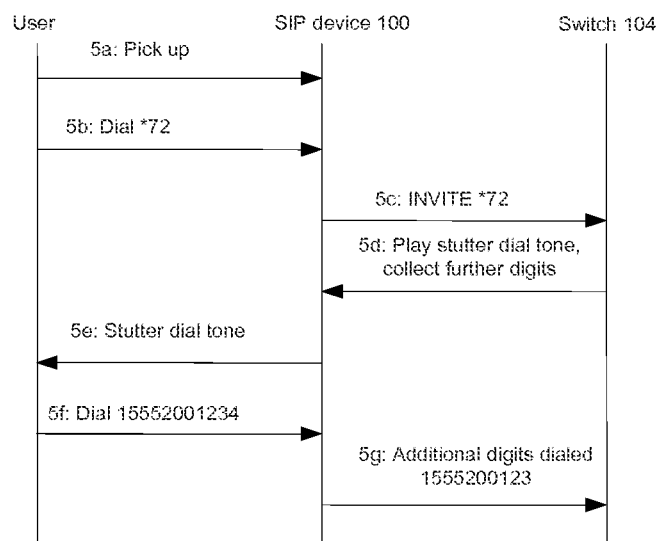
FIG. 5 shows a flow diagram according to embodiments.

FIG. 5 shows a flow diagram according to embodiments. Such embodiments involve a method of modifying settings of communication services for SIP devices in a telecommunications network.

In step 5a, a user of SIP device 100 wishes to modify one or more settings of an unconditional call forwarding communication service so picks up the handset of SIP device 100 and dials an access code *72 in step 5b. SIP device 100 has been provisioned with a digit map that matches access codes. An example such digit map is *[014-9]X, which matches digit patterns such as *15 or *72. Correspondingly, when the user picks up the handset and dials digits corresponding to an access code, the SIP device will determine that the digit map is fully matched and react accordingly.

SIP device 100 transmits a SIP message to switch 104 in step 5c. In this case, the SIP message of step 5c comprises a SIP communication session setup request message in the form of a SIP INVITE message. The SIP INVITE message of step 5c comprises the access code entered by the user of SIP device 100 which identifies the communication service in question, in this case an unconditional call forwarding service.

SIP device 100 will buffer (i.e. store off and remember) any further digits the user dials from this point on.

When switch 104 receives the SIP INVITE message of step 5c, it consults communication service data stored in database 106 and determines, on the basis of the received access code, that the communication service which the access code relates to is an unconditional call forwarding service. Switch 104 invokes the appropriate feature logic for an unconditional call forwarding service and determines that a telephone number to which calls should be forwarded to is required for modifying settings of the unconditional call forwarding service. Switch 104 therefore determines that a collect digit function should be activated on SIP device 100. The collect digit function requires a telephone number so characteristics of this function comprise digit map data specifying that digits of a telephone number should be collected by the digit collection function.

Switch 104 also determines that a stutter dial tone should be played by SIP device 100 to indicate to the user that they may begin to enter in the digits of the telephone number to which they want calls to be forwarded to. The characteristics of the play tone function define the stutter dial tone and may for example include parameters such as number of tone frequencies, on/off times and amplitudes of one or more tone components etc.

Switch 104 transmits a SIP message to SIP device 100 in step 5d. In this case, the SIP message of step 5d comprises a SIP communication session setup response message in the form of a SIP 484 Address Incomplete message. The SIP 484 Address Incomplete message of step 5d comprises data specifying one or more characteristics of at least one function to be activated by SIP device 100 in relation to the identified unconditional call forwarding communication service. In this case, the at least one function includes two functions, i.e. a collect digit function and also a play tone function, with characteristics for the former comprising a digit map for a standard telephone number and characteristics for the latter comprising a number of parameters defining a stutter dial tone.

When the SIP message of step 5d comprising data specifying one or more characteristics of the digit map collection and play tone functions is received at SIP device 100, SIP device 100 activates a play tone function in step 5e, in particular, a play stutter tone function according to the received characteristics defining the play stutter tone function. SIP device 100 also activates a collect digit function according to the received characteristics defining a digit map for a telephone number.

When the user hears the stutter dial tone, the user enters communication service data in the form of digits for the telephone number they would like calls to be forwarded to in step 5f. When SIP device 100 detects that it has collected digits which map the telephone number digit map it transmits a SIP message to switch 104 in step 5g.

In this case, the SIP message of step 5g comprises a SIP communication session setup request message which could for example be in the form of a SIP INVITE message, a SIP INFO message or a SIP UPDATE message. The SIP message of step 5g comprises the communication service data entered by the user of the SIP device, i.e. the digits of the telephone number they would like calls to be forwarded to.

When switch 104 receives the SIP message of step 5g, it extracts the communication service data entered by the user of SIP device 100, i.e. the digits of the telephone number entered by the user of SIP device 100. Switch 104 consults database 106 and processes the communication service data accordingly in order to modify one or more settings of the unconditional call forwarding service.

Note that if the user of SIP device 100 had begun to dial digits of a telephone number immediately after entering the access code *72 in step 5b, these digits would not have been lost because SIP device 100 would have buffered these dialed digits; such digits would therefore be available to SIP device 100 for insertion into the SIP message of step 5g.

In the embodiments of FIG. 5, the user entered all of one or more digits specified in the digit map data received by SIP device 100 from switch 104 such that the communication service data transmitted to switch 104 in step 5g provided switch 104 with sufficient information (in this case a telephone number) to process modification of one or more settings of the unconditional call forwarding communication service accordingly.

Figure 6:
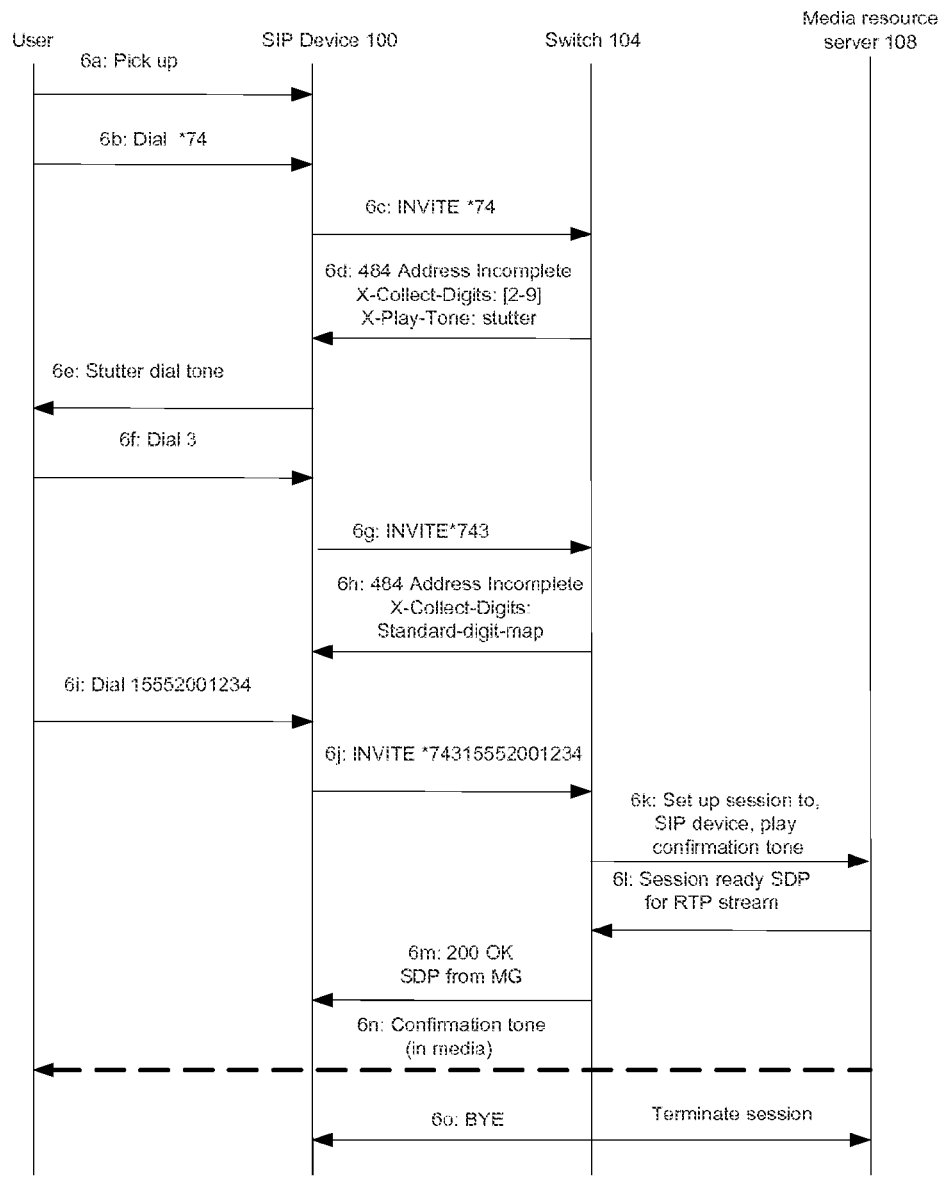
FIG. 6 shows a flow diagram according to embodiments.

FIG. 6 shows a flow diagram according to embodiments. Such embodiments involve a method of modifying settings of communication services for SIP devices in a telecommunications network. In this case, the user of SIP device 100 wishes to configure a new one-digit speed dial number.

In step 6a, a user of SIP device 100 wishes to modify one or more settings of a speed dial communication service so picks up the handset of SIP device 100 and dials an access code *74 in step 6b. When the user picks up the handset and dials the digits corresponding to this access code, SIP device 100 determines that the digit map for an access code has been fully matched so transmits a SIP message to switch 104 in step 6c. In this case, the SIP message of step 6c comprises a SIP communication session setup request message in the form of a SIP INVITE message. The SIP INVITE message of step 6c comprises the access code entered by the user of SIP device 100 which identifies the communication service in question, in this case a speed dial service.

When switch 104 receives the SIP INVITE message of step 6c, it consults communication service data stored in database 106 and determines, on the basis of the received access code, that the communication service which the access code relates to is a speed dial service. Switch 104 invokes the appropriate feature logic for a speed dial service and determines that a single digit is required for modifying settings of the speed dial service. The single digit here corresponds to the keypad number which the user would like to use for invoking the speed dial service.

Switch 104 therefore determines that a collect digit function should be activated on SIP device 100. The collect digit function requires a single digit so characteristics of this function comprise digit map data specifying a single digit to be collected by the digit collection function.

Switch 104 also determines that a stutter dial tone should be played by SIP device 100 to indicate to the user that they should now enter in the single digit for the keypad key to which they want the speed dial service to be assigned to. Switch 104 transmits a SIP message to SIP device 100 in step 6d. In this case, the SIP message of step 6d comprises a SIP communication session setup response message in the form of a SIP 484 Address Incomplete message. The SIP 484 Address Incomplete message of step 6d comprises data specifying one or more characteristics of at least one function to be activated by SIP device 100 in relation to the identified speed dial communication service. In this case, the at least one function includes a collect digit function and also a play tone function, with characteristics for the former comprising a digit map for a single digit and characteristics for the latter comprising a number of parameters defining a stutter dial tone. The collect digit map data is indicated in step 6d of FIG. 6 as X-Collect-Digits: [2-9] denoting that a single digit other than 0 or 1 is required to match the digit map. The play tone function is indicated in step 6d of FIG. 6 as X-Play-Tone: stutter, in this case indicating that a function to play a stutter tone should be activated on SIP Device 100. The 'X' denotes an extension header of the SIP message.

When the SIP message of step 6d comprising data specifying one or more characteristics of the digit map collection and play tone functions is received at SIP device 100, SIP device 100 activates a play tone function in step 6e, in particular, a play stutter tone function according to the received characteristics defining the play stutter tone function. SIP device 100 also activates a collect digit function according to the received characteristics defining a digit map for a single digit.

When the user hears the stutter dial tone, the user enters communication service data in the form of a digit for the telephone keypad number they would like to activate the speed dial function in step 6f, in this case the digit 3. When SIP device 100 detects that it has collected a single digit it determines that the activated digit map has been fully matched and reacts accordingly. SIP device 100 therefore transmits a SIP message to switch 104 in step 6g.

In this case, the SIP message of step 6g comprises a SIP communication session setup request message in the form of a SIP INVITE message. The SIP message of step 6g comprises the communication service data entered by the user of the SIP device, i.e. the digit 3 which the user would like to assign the speed dial number to. The SIP INVITE message of step 6g also comprises the access code *74 which were entered by the user previously.

When switch 104 receives the SIP message of step 6g, it extracts the communication service data entered by the user of SIP device 104, i.e. the access code and single digit. Switch 104 consults communication service data stored in database 106, processes the communication service data accordingly and determines that a telephone number which is to be dialed when the speed dial digit is pressed by the user is also required for modifying settings of the speed dial service. Switch 104 therefore determines that a collect digit function should be activated on SIP device 100. The collect digit function requires a telephone number so characteristics of this function comprise digit map data specifying the digits of a telephone number to be collected by the digit collection function.

Switch 104 transmits a SIP message to SIP device 100 in step 6h. In this case, the SIP message of step 6h comprises a SIP communication session setup response message in the form of a SIP 484 Address Incomplete message. The SIP 484 Address Incomplete message of step 6h comprises data specifying one or more characteristics of at least one function to be activated by SIP device 100 in relation to the identified speed dial communication service. In this case, the at least one function includes a collect digit function with characteristics comprising a digit map for a telephone number. The collect digit map data is indicated in step 6h of FIG. 6 as X-Collect-Digits 'standard-digit-map' denoting that the digits of a standard telephone number are required to match the digit map. The 'X' here denotes an extension header of the SIP message.

When the SIP message of step 6h comprising data specifying one or more characteristics of the digit map collection function is received at SIP device 100, SIP device 100 activates a collect digit function according to the received characteristics defining a digit map for a telephone number.

In step 6i, the user enters communication service data in the form of a digit for a telephone number they would like a call to be initiated to when the speed dial digit key is pressed, in this case telephone number 15552001234. When SIP device 100 detects that it has collected digits of a standard telephone number it determines that the activated digit map has been fully matched and reacts accordingly. SIP device 100 therefore transmits a SIP message to switch 104 in step 6j.

In this case, the SIP message of step 6j comprises a SIP communication session setup request message in the form of a SIP INVITE message. The SIP message of step 6j comprises the communication service data entered by the user of the SIP device, i.e. the telephone number which will be dialed when the speed dial service is initiated. The SIP INVITE message of step 6j also comprises the access code *74 and the single digit 3 which were entered by the user previously.

When switch 104 receives the SIP message of step 6j, it extracts the communication service data entered by the user of SIP device 100, i.e. the single speed dial service initiation digit and digits of the telephone number entered by the user of SIP device 100. Switch 104 consults database 106, processes the communication service data and determines that it now has sufficient information in order to modify one or more settings of the speed dial service accordingly, i.e. the user of SIP device 100 can now dial telephone number 15552001234 using a speed dial function initiated by the single press of keypad digit 3 on SIP device 100.

In embodiments, switch 104 initiates establishment of a communication session between SIP device 100 and media resource server 108 for communication of media data in relation to the identified speed dial service. In particular, switch 104 initiates set up of a media session between SIP device 100 and media resource server 108 in step 6k in order that a confirmation tone or announcement is played to SIP device 100 by media resource server 108. The confirmation tone or announcement serves to inform the user of SIP device 100 that their communication service has been modified as requested.

Media resource server 108 accepts the request for establishment of a media session and transmits appropriate SDP data to switch 104 in step 6l. Switch 104 transmits a SIP 200 OK message containing the SDP address data for media resource server 108 to SIP device 100 in step 6m. Media resource server 108 then plays a confirmation tone or announcement as a media stream to SIP device 100 in step 6n. Once the confirmation tone or announcement has completed, switch 104 tears down the session by sending a SIP Bye message to SIP device 104 in step 6o.

In embodiments, the SIP 484 Address Incomplete message of step 6h could also include data specifying one or more characteristics of a further function to be activated by SIP device 100 in relation to the identified speed dial communication service. The further function could for example be a play tone function for a different tone to the stutter tone specified in step 6d which, when activated on SIP device 100, would alert the user of SIP device 100 that they should now be entering a telephone number as opposed to a single digit as previously indicated by the stutter dial tone.

In an alternative embodiment, instead of a confirmation tone or announcement being played via a media stream established between media resource server 108 and SIP device 100 in steps 6k to 6n, a suitable SIP message could be transmitted from switch 104 to SIP device 100 containing data specifying one or more characteristics of another play tone function to be activated by SIP device 100. The another tone would sound different to the stutter dial tone of step 6d, for example a confirmation tone.

In an alternative embodiment, data specifying one or more characteristics of at least one function to be activated by SIP device 100 in relation to the identified speed dial communication service in step 6d could include both a first collect digit function for collecting a single digit as well as a second collect digit function for collecting the digits of a telephone number. Both collect digits functions could then be activated by SIP device 100 in response to receipt of the SIP message of step 6d at the same time or sequentially, without the need for two separate specifications in steps 6d and 6h respectively. Further alternatively, a combined digit collection function could be specified in step 6d for a single digit map which requires a single digit followed by the digits of a telephone number to be entered by the user for matching.

Figure 7:
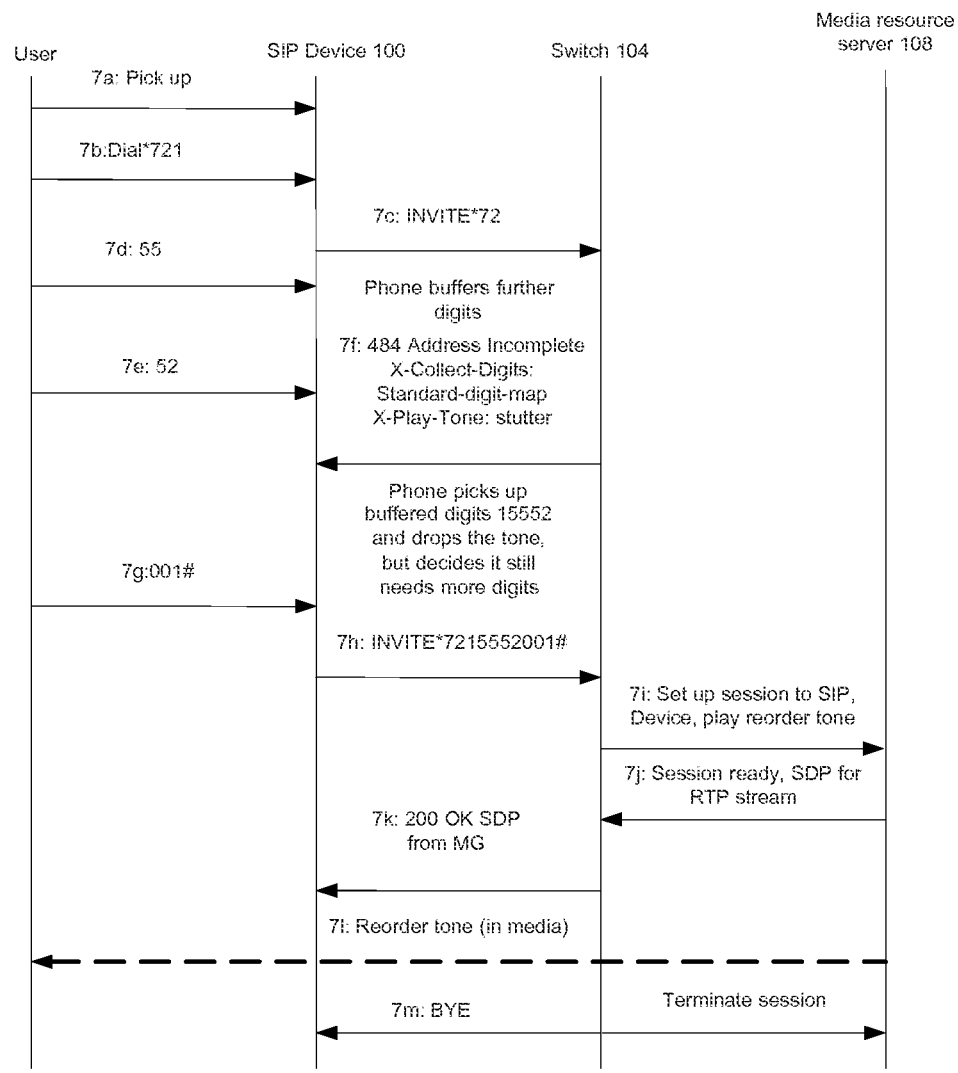
FIG. 7 shows a flow diagram according to embodiments.

FIG. 7 shows a flow diagram according to embodiments. Such embodiments involve a method of modifying settings of communication services for SIP devices in a telecommunications network. In this case, the user of SIP device 100 wishes to enable unconditional call forwarding.

In step 7a, a user of SIP device 100 wishes to modify one or more settings of an unconditional call forwarding service so picks up the handset of SIP device 100 and dials the digits of an access code *72. The user continues to enter in communication service data by dialing the digits of a telephone number to which they would like calls forwarded to under the unconditional call forwarding service. Step 7b denotes the user dialing the digits *721, i.e. digits *72 for the access code and the first digit (1) of a telephone number.

Once the digits *72 have been dialed, SIP device 100 determines that the digit map for an access code has been fully matched so transmits a SIP message to switch 104 in step 7c. In this case, the SIP message of step 7c comprises a SIP communication session setup request message in the form of a SIP INVITE message. The SIP INVITE message of step 7c comprises the access code entered by the user of SIP device 100 which identifies the communication service in question, in this case an unconditional call forwarding service.

When switch 104 receives the SIP INVITE message of step 7c, it consults communication service data stored in database 106 and determines, on the basis of the received access code, that the communication service which the access code relates to is an unconditional call forwarding service. Switch 104 invokes the appropriate feature logic for an unconditional call forwarding service and determines that the digits of a telephone number are required for modifying settings of the unconditional call forwarding service. The telephone number here corresponds to the telephone number which the user would like calls forwarded to under the unconditional call forwarding service.

Switch 104 therefore determines that a collect digit function should be activated on SIP device 100. The collect digit function requires digits of a telephone number so characteristics of this function comprise digit map data specifying the digits of telephone number to be collected by the digit collection function.

Switch 104 also determines that a stutter dial tone should be played by SIP device 100 to indicate to the user that they should now enter in the digits of a telephone number to which they want calls forwarded to. Switch 104 transmits a SIP message to SIP device 100 in step 7f. In this case, the SIP message of step 7f comprises a SIP communication session setup response message in the form of a SIP 484 Address Incomplete message. The SIP 484 Address Incomplete message of step 7f comprises data specifying one or more characteristics of at least one function to be activated by SIP device 100 in relation to the identified unconditional call forwarding communication service. In this case, the at least one function includes a collect digit function and also a play tone function, with characteristics for the former comprising a digit map for digits of a telephone number and characteristics for the latter comprising a number of parameters defining a stutter dial tone. The collect digit map data is indicated in step 7f of FIG. 7 as X-Collect-Digits: standard-digit-map denoting that the digits of a standard telephone number are required to match the digit map.

Whilst the steps 7c and 7f are being carried out by switch 104, the user of SIP device 100 has been entering in communication service data in the form of digits of a telephone number as indicated by steps 7d (digits 55) and 7e (digits 52). These digits have been buffered by SIP device 100.

When the SIP message of step 7f comprising data specifying one or more characteristics of the digit map collection and play tone functions is received at SIP device 100, SIP device 100 has two options as to the activating of the play stutter tone function. In a first option (as depicted in FIG. 7), SIP device 100 chooses not to play the stutter tone function in order to avoid interrupting or otherwise confusing the user of SIP device 100 who has already proceeded to enter in the digits of a telephone number. In a second option (not depicted in FIG. 7) SIP device 100 chooses to activate a play stutter tone function in a similar manner to that described above in relation to step 5e of FIG. 5 or step 6e of FIG. 6.

Regardless of the option taken in relation to the stutter dial tone, SIP device 100 activates a collect digit function according to the received characteristics defining a digit map for a telephone number. The digits that have already been entered by the user after the access code (i.e. 1 from step 7b, 55 from step 7d and 52 from step 7e) and buffered are applied to the activated digit collection function. The digit collection function still requires more than these digits (15552) for a standard telephone number.

The user of SIP device 100 continues to enter in communication service data, in this case the digits 001 followed by # in step 7g. Entry of the symbol # (sometimes referred to as the 'hash', 'pound' or 'octothorpe' symbol) in this embodiment is a misdial by the user of SIP device 100. SIP device 100 detects that entry of the symbol # means that the requirements of the digit map for the activated digit collection function cannot be met. SIP device 100 therefore transmits a SIP message to switch 104 in step 7h.

In this case, the SIP message of step 7h comprises a SIP communication session setup request message in the form of a SIP INVITE message. The SIP message of step 7h comprises the communication service data entered by the user of the SIP device, i.e. the digits of the telephone number entered thus far (15552001), plus the misdialed # symbol. The SIP INVITE message of step 7h also comprises the access code *74 which were entered by the user previously.

When switch 104 receives the SIP message of step 7h, it extracts the communication service data entered by the user of SIP device 100, i.e. the digits of the telephone number entered thus far (15552001), plus the misdialed # symbol entered by the user of SIP device 100. Switch 104 consults database 106, processes the communication service data and determines that # is not specified in the digit map data; switch 104 thus concludes that it does not have sufficient information to modify one or more settings of the unconditional call forwarding service.

Switch 104 initiates establishment of a communication session between SIP device 100 and media resource server 108 for communication of media data in relation to the identified unconditional call forwarding service. In particular, switch 104 initiates set up of a media session between SIP device 100 and media resource server 108 in step 7i in order that a reorder tone (or announcement) is played to SIP device 100 by media resource server 108. The reorder tone serves to inform the user of SIP device 100 that a misdial has been detected such that modification of the communication service cannot be carried out as requested.

Media resource server 108 accepts the request for a media session and transmits appropriate SDP data to switch 104 in step 7j. Switch 104 transmits a SIP 200 OK message containing the SDP address data for media resource server 108 to SIP device 100 in step 7k. Media resource server 108 then plays a reorder tone as a media stream to SIP device 100 in step 7l. Once the confirmation tone or announcement has completed, switch 104 tears down the session by sending a SIP Bye message to SIP device 104 in step 7m.

In an alternative embodiment, instead of a reorder tone or announcement being played via a media stream established between media resource server 108 and SIP device 100 in step 7l, an additional SIP message is transmitted from switch 104 to SIP device 100 containing data specifying one or more characteristics of a play reorder tone function to be activated by SIP device 100. The additional SIP message transmitted from switch 104 to SIP device 100 may also contain data specifying one or more further characteristics of at least one further function to be activated by the SIP device in relation to the identified communication session; in this case the at least one further function could be a further digit collection function with further characteristics comprising further digit map data specifying digits of a telephone number to be collected by SIP device 100.

In embodiments described above, switch 104 transmits a SIP message in the form of a SIP 484 Address Incomplete message to SIP device 100 which comprises data specifying one or more characteristics of at least one function to be activated by SIP device 100 in relation to an identified communication session. In alternative embodiments, instead of a SIP 484 Address Incomplete message, a SIP 183 Session Progress message or a SIP INFO message could be used.

In embodiments, the data specifying the one or more characteristics of at least one function are contained in an extension header of the SIP 484 Address Incomplete, SIP 183 Session Progress, or SIP INFO message. In other embodiments, the data specifying the one or more characteristics of at least one function are contained in a SIP message header, for example a SIP Alert-Info or a SIP Min-Digits header.

In embodiments described above, SIP device 100 transmits a SIP message in the form of a SIP INVITE message comprising communication service data entered by the user of SIP device 100. In alternative embodiments, instead of a SIP INVITE message, a SIP INFO message or a SIP UPDATE message could be used.

In embodiments the code comprises a telephone number. Such embodiments could for example involve accessing systems or services which are protected by a Personal identification number (PIN) or other such private key or identifier.

In an example of such an embodiment, a user enters a code in the form of a telephone number for their voicemail account on their SIP device 100 which results in switch 104 receiving a code-containing SIP message containing the telephone number. Switch 104 identifies the communication service as a voicemail service on the basis of the received telephone number and transmits a function-activating SIP message to SIP device 100 which contains data specifying one or more characteristics of a PIN collection function to be activated by SIP device 100 in a data collection operation. The one or more characteristics could for example comprise a 4-digit PIN or a 6-digit PIN. SIP device 100 thus collects digits of the user's PIN which are transmitted to switch 104 as communication service data in a completed data-containing SIP message. Switch 104 processes the PIN communication service data accordingly, for example by recognising that the PIN is correct and granting the user access to their voicemail service.

A further example of such an embodiment involves a communication service called a Mandatory Account Code service. Here, a user dials a code in the form of a telephone number associated with a Mandatory Account Code service which results in switch 104 receiving a code-containing SIP message containing the telephone number. Switch 104 identifies the communication service as a Mandatory Account Code service on the basis of the received telephone number and transmits a function-activating SIP message to SIP device 100 which contains data specifying one or more characteristics of an account number collection function to be activated by SIP device 100 in a data collection operation. The one or more characteristics could for example comprise a 12-digit account number. SIP device 100 thus collects digits of the account number entered by the user which are transmitted to switch 104 as communication service data in a completed data-containing SIP message. Switch 104 processes the account number communication service data accordingly, for example by granting access to the account the user is attempting to access. Here, the account number could comprise a client account number for a telephone call to be billed to.

A still further example of such an embodiment involves a user entering a code in the form of a telephone number for a company switchboard on their SIP device 100 which results in switch 104 receiving a code-containing SIP message containing the telephone number. Switch 104 identifies the communication service as a call setup service on the basis of the received telephone number and transmits a function-activating SIP message to SIP device 100 which contains data specifying one or more characteristics of an extension number collection function to be activated by SIP device 100 in a data collection operation. The one or more characteristics could for example comprise a 3-digit number corresponding to an internal telephone extension number for a telephone associated with a particular employee of the company. SIP device 100 thus collects digits of the extension number which are transmitted to switch 104 as communication service data in a completed data-containing SIP message. Switch 104 processes the extension number communication service data accordingly, for example by setting up a call to the appropriate company employee's telephone.

Embodiments relate to a method of modifying settings for communication services for SIP devices in a telecommunications network, the method comprising:
  receiving, from a SIP device, a SIP communication session setup request message comprising an access code identifying a communication service;
  determining, on the basis of the received access code, digit map data specifying one or more digits to be collected by the SIP device in relation to the identified communication service; and
  transmitting, to the SIP device, a SIP communication session setup response message comprising the digit map data.

Other embodiments relate to a method of modifying settings for communication services for SIP devices in a telecommunications network, the method comprising:
  receiving, from a SIP device, a SIP communication session setup request message comprising an access code identifying a communication service;
  determining, on the basis of the received access code, tone specification data specifying a tone to be played by the SIP device in relation to the identified communication service; and
  transmitting, to the SIP device, a SIP communication session setup response message comprising the tone specification data.

Further embodiments relate to a method of modifying settings for communication services for SIP devices in a telecommunications network, the method comprising:
  receiving, from a SIP device, a SIP communication session setup request message comprising a code identifying a communication service;
  determining, on the basis of the received code, digit map data specifying one or more digits to be collected by the SIP device in a data collection operation; and
  transmitting, to the SIP device, a SIP communication session setup response message comprising the digit map data.

Still further embodiments relate to a method of modifying settings for communication services for SIP devices in a telecommunications network, the method comprising:
  receiving, from a SIP device, a SIP communication session setup request message comprising a code identifying a communication service;
  determining, on the basis of the received code, tone specification data specifying a tone to be played by the SIP device in a data collection operation; and transmitting, to the SIP device, a SIP communication session setup response message comprising the tone specification data.

The above embodiments are to be understood as illustrative examples. Further embodiments are envisaged.

For example, the above embodiments have been described in a scenario where the user has a SIP device. However, embodiments may also be applied where the user device is not a SIP device, for example where the user device is connected to a SIP Broadband Loop Carrier or because the feature server has a SIP interface to a telephone switch or call control function.

Embodiments have been described above in relation to a SIP user device with feature logic being hosted and applied by a switch such as a softswitch. Embodiments can also apply to a scenario where the SIP device is an IP Multimedia Subsystem (IMS) Access Gateway Controller (AGC) and the feature logic is on a SIP Application Server that can invoke a Media Resource Server (MRS).

In the above embodiments, stutter, reorder and confirmation tones have been employed for indicating to a user a status of a communication service and/or a number of digits that they should be entering in order to modify one or more settings of a communication service. In alternative embodiments, broken or prompt tones may also be employed.

In embodiments, SIP device 100 has knowledge of tones stored locally, in which case, the one or more characteristics transmitted from switch 104 need only contain an identifier for the tone which allows SIP device 100 to select the correct (or closest it has available) tone from its local data store. In other embodiments, one or more characteristics of a tone are transmitted from switch 104 to SIP device 100. The characteristics could comprise one or more parameters which define the tone, allowing SIP device 100 to synthesise the tone itself. In further embodiments, the characteristics could comprise a Uniform Resource Identifier (URI) at which media data for a tone could be retrieved by SIP device 100; such a URI could be relayed to SIP Device 100 in the form of a SIP Error-Info header, for example X-Play-Tone: reorder, Error-Info: http://12.34.56.78/tones/reorder.wav.

The above embodiments involve activation of digit collection and play tone functions on a SIP device. Embodiments need not include activation of both functions on a SIP device, for example involving only activation of one or the other, or could involve activation of more than one digit collection function and/or more than one play tone function. Alternatively, embodiments could include activation of neither of these functions on a SIP device, instead involving activation of one or more other, different, functions.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of modifying settings of communication services for Session Initiation Protocol (SIP) devices in a telecommunications network, the method comprising:
   receiving, at a server from a SIP device, a code-containing SIP message comprising a code entered by a user of the SIP device, the code identifying a communication service, wherein the communication service comprises one or more settings that can be modified by the user of the SIP device;
   determining, at the server, on the basis of the received code, the communication service that the code relates to;
   transmitting, from the server to the SIP device, a function-activating SIP message comprising data specifying one or more characteristics of at least one function to be activated by the SIP device in a data collection operation, wherein the data collection operation comprises collecting communication service data entered by the user of the SIP device;
   receiving, at the server from the SIP device, a completed data-containing SIP message comprising the communication service data entered by the user of the SIP device for use in modifying the one or more settings of the identified communication service entered by the user of the SIP device; and
   processing, at the server, the communication service data in accordance with the identified communication service, wherein the processing does not result in setup of a communication session involving a remote user.

2. The method of claim 1, wherein the processing comprises modifying one or more settings of the identified communication service for the SIP device according to the received communication service data.

3. The method of claim 1, wherein the at least one function comprises the playing of a tone and the one or more characteristics comprise one or more characteristics of a tone to be played by the SIP device, and/or the at least one function comprises a digit collection function and the one or more characteristics comprise digit map data specifying one or more digits to be collected by the digit collection function.

4. The method of claim 3, comprising:
   receiving, from the SIP device, an incorrect data-containing SIP message comprising one or more digits not specified in the digit map data; and
   transmitting, in response to the incorrect data-containing SIP message, a further function-activating SIP message comprising data specifying one or more characteristics of at least one function to be activated by the SIP device in a further data collection operation.

5. The method of claim 3, wherein the digit map data specifies a plurality of digits to be collected by the digit collection function, the method comprising:
   receiving, from the SIP device, an incomplete data-containing SIP message comprising at least one, but not all, of the plurality of digits specified in the digit map data; and
   transmitting, in response to the incomplete data-containing SIP message, a further function-activating SIP message comprising data specifying one or more characteristics of at least one function to be activated by the SIP device in a further data collection operation.

6. The method of claim 4, wherein the further function-activating SIP message comprises data specifying one or more characteristics of a digit collection function, or the further function-activating SIP message comprises data specifying one or more characteristics of a tone to be played by the SIP device.

7. The method of claim 1, wherein the processing comprises initiating establishment of a communication session between the SIP device and a media resource server for communication of media data in relation to the identified communication service.

8. The method of claim 7, wherein the initiation comprises transmitting a SIP 200 OK message to the SIP device, the SIP 200 OK message comprising SDP address data for the media resource server.

9. The method of claim 1, wherein the completed data-containing SIP message comprises the code in addition to the communication service data.

10. A method of modifying settings of communication services for SIP devices in a telecommunications network, the method comprising:
   transmitting, from a SIP device to a server, a code-containing SIP message comprising a code entered by a user of the SIP device, the code identifying a communication service, wherein the communication service comprises one or more settings that can be modified by the user of the SIP device;
   receiving, at the SIP device from the server, a function-activating SIP message comprising data specifying one or more characteristics of at least one function to be activated by the SIP device;
   activating, at the SIP device, the at least one function in a data collection operation, wherein the data collection operation comprises collecting communication service data entered by the user of the SIP device; and
   in response to receipt of the communication service data entered by the user of the SIP device for use in modifying the one or more settings of the identified communication service via user entry, transmitting from the SIP device to the server a completed data-containing SIP message comprising the communication service data.

11. The method of claim 10, wherein the at least one function comprises the playing of a tone and the one or more characteristics comprise one or more characteristics of a tone to be played by the SIP device, and/or the at least one function comprises a digit collection function and the one or more characteristics comprise digit map data specifying one or more digits to be collected by the digit collection function.

12. The method of claim 11, comprising:
   transmitting, from the SIP device, an incorrect data-containing SIP message comprising one or more digits not specified in the digit map data; and
   receiving, in response to the incorrect data-containing SIP message, a further function-activating SIP message comprising data specifying one or more characteristics of at least one function to be activated by the SIP device in a further data collection operation.

13. The method of claim 12, wherein the digit map data specifies a plurality of digits to be collected by the digit collection function, the method comprising:
   transmitting, from the SIP device, an incomplete data-containing SIP message comprising at least one, but not all, of the plurality of digits specified in the digit map data; and
   receiving, in response to the incomplete data-containing SIP message, a further function-activating SIP message comprising data specifying one or more characteristics of at least one function to be activated by the SIP device in a further data collection operation.

14. The method of claim 13, wherein the further function-activating SIP message comprises data specifying one or more characteristics of a digit collection function, and/or the further function-activating SIP message comprises data specifying one or more characteristics of a tone to be played by the SIP device.

15. The method of claim 1, wherein the code-containing SIP message comprises:
   a SIP INVITE message;
   a SIP INFO message; or
   a SIP UPDATE message,
   wherein the, or each, function-activating SIP message comprises one or more of:
   a SIP 484 Address Incomplete message;
   a SIP 183 Session Progress message; and/or
   a SIP INFO message, and/or
   wherein the, or each, data-containing SIP message comprises one or more of:
   a SIP INVITE message;
   a SIP INFO message; and/or
   a SIP UPDATE message.

16. The method of claim 1, wherein at least a part of the data specifying the one or more characteristics of the at least one function are contained in one or more of:
   an extension header of the respective function-activating SIP message,
   the message body of the respective function-activating SIP message, and
   a SIP Alert-Info or a SIP Min-Digits header.

17. The method of claim 1, wherein the code comprises an access code for the communication service.

18. The method of claim 1, wherein the code comprises a telephone number for the communication service.

19. A system for modifying settings of communication services for Session Initiation Protocol (SIP) devices in a telecommunications network, comprising:
   a data store comprising executable software;
   a processor in data communication with the data store, the processor configured to execute the software and cause a computing device to:
   receive from a SIP device, a code-containing SIP message comprising a code entered by a user of the SIP device, the code identifying a communication service, wherein the communication service comprises one or more settings that can be modified by the user of the SIP device;
   determine, on the basis of the received code, the communication service that the code relates to;
   transmit, to the SIP device, a function-activating SIP message comprising data specifying one or more characteristics of at least one function to be activated by the SIP device in a data collection operation, wherein the data collection operation comprises collecting communication service data entered by the user of the SIP device;
   receive, from the SIP device, a completed data-containing SIP message comprising the communication service data entered by the user of the SIP device for use in modifying the one or more settings of the identified communication service entered by the user of the SIP device; and
   process, the communication service data in accordance with the identified communication service, wherein the process does not result in setup of a communication session involving a remote user.

20. A non-transitory computer-readable storage medium having computer readable instructions which, when executed by a processor, cause a computing device to perform a method of modifying settings of communication services for Session Initiation Protocol (SIP) devices in a telecommunications network, the method comprising:
   receiving, at a server from a SIP device, a code-containing SIP message comprising a code entered by a user of the SIP device, the code identifying a communication service, wherein the communication service comprises one or more settings that can be modified by the user of the SIP device;

determining, at the server, on the basis of the received code, the communication service that the code relates to;

transmitting, from the server to the SIP device, a function-activating SIP message comprising data specifying one or more characteristics of at least one function to be activated by the SIP device in a data collection operation, wherein the data collection operation comprises collecting communication service data entered by the user of the SIP device;

receiving, at the server from the SIP device, a completed data-containing SIP message comprising the communication service data entered by the user of the SIP device for use in modifying the one or more settings of the identified communication service entered by the user of the SIP device; and processing, at the server, the communication service data in accordance with the identified communication service, wherein the processing does not result in setup of a communication session involving a remote user.

* * * * *